United States Patent Office 3,205,165
Patented Sept. 7, 1965

3,205,165
HYDROREFINING PROCESS
Lee Hilfman, Prospect Heights, Ill., assignor to Universal Oil Products Company, Des Plaines, Ill., a corporation of Delaware
No Drawing. Filed Aug. 23, 1963, Ser. No. 304,271
12 Claims. (Cl. 208—254)

This invention relates to the hydrorefining of nitrogenous petroleum fractions and in particular to an improved catalyst with respect thereto. This application is a continuation-in-part of my copending application Serial No. 43,276, filed July 18, 1960, now abandoned.

Petroleum charge stocks presently available for the various hydrocarbon conversion processes invariably contain at least small amounts of sulfurous and nitrogenous materials, usually organically bound sulfur and organically bound nitrogen. Although present in only small amounts the sulfurous and nitrogenous materials have an adverse affect on hydrocarbon conversion. For example, it is now recognized that the more difficultly separable nitrogenous materials are the principal deactivants of conventional hydrocracking catalysts and the presence of said nitrogenous materials in excess of only about 100 parts per million necessitates more severe hydrocracking conditions and/or intermittent operation. In the present state of the art relating to hydrocracking, it is generally considered that successful operation is dependent on petroleum charge stocks containing less than about 1 part per million nitrogen. The separation of nitrogeneous materials is particularly difficult when treating heavy oils, say petroleum fractions boiling in excess of about 650° F.

Hydrorefining catalysts containing molybdenum on a carrier material are particularly effective in the hydrorefining of petroleum fractions to separate sulfurous and/or nitrogenous materials therefrom. It has been observed that the activity of said catalysts, particularly with respect to the separation of nitrogenous materials, is directly proportional to the molybdenum content of the catalyst. However, due to the surface area and pore volume characteristics of suitable carrier materials like alumina, the amount of molybdenum which can be deposited thereon is limited to about 20 wt. percent or a utilizable amount not exceeding about 30 wt. percent when multiple impregnation is resorted to.

It is therefore an object of this invention to present a method of hydrorefining a petroleum fraction particularly a petroleum fraction boiling in excess of about 650° F., containing nitrogenous and/or sulfurous materials. It is a more specific object of this invention to present an improved molybdenum-containing hydrorefining catalyst particularly adapted to the treatment of nitrogenous petroleum fractions.

In one of its broad aspects the present invention embodies a method of hydrorefining a nitrogenous petroleum fraction boiling in the range of from about 400° F. to about 1200° F. and containing in excess of about 1 part per million nitrogen, which method comprises treating said petroleum fraction in admixture with hydrogen at hydrorefining conditions in contact with a hydrorefining catalyst comprising a composite prepared by commingling a solution of a compound of molybdenum and a solution of a compound of at least one metal from Groups IIIA and IVB of the Periodic Table at a pH of from about 3.8 to about 7 and forming a coprecipitate, calcining the coprecipitate and impregnating said calcined coprecipitate with further amounts of molybdenum by contacting the same with a solution of a compound of molybdenum, the concentration of said solution being such as to insure a final calcined composite containing from about 15 wt. percent to about 50 wt. percent molybdenum as molybdenum oxide.

Further objects and embodiments of this invention will become apparent in the following detailed specification.

Pursuant to the method of this invention, a nitrogenous petroleum fraction boiling in the range of from about 400° F. to about 1200° F. is hydrorefined in the presence of hydrogen and in contact with a hydrorefining catalyst. Petroleum fractions treated in accordance with the present method thus include the gas oils, fuel oils, kerosenes, etc., recovered as distillate in the atmospheric distillation of crude oils, also the light and heavy vacuum gas oils resulting from the vacuum distillation of reduced crudes. Also included are the light and heavy cycle oils recovered from the catalytic cracking process, light and heavy coker gas oils resulting from low pressure coking, and also coal tar distillates and the like. Residual oils, often referred to as asphaltum oil, liquid asphalt, black oil, residuum, etc., obtained as liquid or semi-liquid residues after the atmospheric or vacuum distillation of crude oils, are operable in the present process although it may be desirable to blend such oils with lower boiling petroleum fractions for economical operation. The nitrogenous petroleum fraction may boil substantially continuously between about 400° F. to about 1200° F. or it may consist of any one or a number of petroleum fractions, such as are set out above, which distill over within the 400-1200° F. range.

Hydrorefining as herein contemplated relates to the hydrogen treatment of petroleum fractions to substantially eliminate certain impurities which although present in only trace amounts nevertheless have a deleterious affect on the various hydrocarbon conversion processes to which the said petroleum fractions are subsequently subjected. Hydrorefining of such petroleum fractions is effected in the presence of hydrogen at temperatures of from about 500° F. to about 850° F., although in some instances temperatures up to 900–950° F. are employed. Atmospheric, and preferably superatmospheric pressures of from about 50 p.s.i. to about 5000 p.s.i. or more, are utilized.

The hydrorefining catalyst of this invention is prepared by initially commingling a solution of a compound of molybdenum and a solution of a compound of at least one metal of Groups IIIA and IVB at a pH of from about 3.8 to about 7 and forming a coprecipitate. Suitable compounds of molybdenum which can be utilized include ammonium molybdate, ammonium paramolybdate, molybdic acid, molybdenum trioxide, and the like, which compounds may be prepared in aqueous solution. Generally the pH of this solution is adjusted to a level in excess of about 7, and preferably as high as 11 or more. However, the adjustment of the pH is important only so far as it affects the hereinafter-mentioned reaction mixture and in some instances may be less than 7. The pH of the molybdenum solution can be adjusted when so required by the addition thereto of an alkaline reagent such as ammonium hydroxide.

The molybdenum solution is commingled with a solution of a compound of at least one metal of Groups IIIA and IVB of the Periodic Table. Groups IIIA and IVB relate to Groups IIIA and IVB of the Periodic Table as presented on pages 400–401 of the 39th edition (1957–58) of the "Handbook of Chemistry and Physics." Groups IIIA and IVB thus comprise boron, aluminum, gallium, indium, thallium, titanium, zirconium, and hafnium. Compounds of said metals which can be utilized are the water soluble compounds thereof such as aluminum chloride, aluminum bromide, aluminum sulfate, aluminum nitrate, zirconium chloride, zirconium carbonate, zirconyl chloride, zirconyl bromide, zirconyl iodide, boron oxide, gallium bromide, gallium chloride, gallium nitrate, gallium sulfate, indium chloride, indium nitrate, indium sulfate, thallium chloride, thallium fluoride, hafnium oxychloride, etc. It is preferred to utilize an aluminum compound such as aluminum chloride, aluminum nitrate, aluminum sulfate, etc., in aqueous solution.

The reaction mixture resulting from the commingling of the molybdenum solution and the solution of a compound of at least one metal of Groups IIIA and IVB, hereinafter referred to as the aluminum solution, is maintained at a pH in the range of from about 3.8 to about 7. Control of the pH level within these prescribed limits is an essential feature of the method herein employed. The pH may be so controlled in a number of ways. In one method an aqueous solution of a compound of molybdenum is prepared, and the pH of said solution is adjusted by the addition of ammonium hydroxide thereto, the particular pH thereof being such that upon commingling of the molybdenum solution and the aluminum solution the pH of the resultant reaction mixture lies within the prescribed limits. In another method the molybdenum solution and the aluminum solution are separately added to an aqueous ammoniacal solution, the concentration thereof being such that upon addition of the aluminum and the molybdenum solutions thereto the pH of the resulting reaction mixture is maintained within the prescribed limits. In any case it is desirable that said commingling be accomplished with rapid stirring or other means of agitation.

The concentration of the molybdenum solution should be such that the resulting coprecipitate, calcined as hereinafter described, contains up to about 20 wt. percent molybdenum as molybdenum oxide. The molybdenum solution can be commingled with the aluminum solution by any method which will insure a uniform composite.

In the process of commingling the molybdenum and aluminum solutions, the desired coprecipitate forms as the pH of the resultant solution varies from about 3.8 to about 7. One preferred method of forming the coprecipitate comprises preparing a solution of a suitable compound of molybdenum, for example an aqueous solution of ammonium molybdate, and adding thereto a solution of a suitable compound of aluminum, for example an aqueous solution of aluminum nitrate, while maintaining the resultant solution at a substantially constant pH, say a pH of about 6, by the continuous or intermittent addition thereto of an alkaline or acidic reagent as the case may require. As the coprecipitate is formed, the molybdenum concentration of the supernatant liquid is maintained substantially constant by the addition thereto of further amounts of a suitable molybdenum compound, for example the aforesaid ammonium molybdate. It is contemplated that a coprecipitate of more uniform composition is prepared in this manner although it is not intended to limit this invention to this particular method of preparation.

The coprecipitate can be aged for a period of from about 0.1 to about 5 hours. The aging period will vary depending on a number of factors which include the composition of the coprecipitate, the pH, the extent of dilution, and the temperature at which the coprecipitate is aged. It is preferred to age said coprecipitate first under acid conditions and then under near basic conditions as it is believed that the acid aging develops the surface area thereof while the basic aging opens up the pore structure, although it is not intended to limit this invention by such theory. The coprecipitate is separated from the mother liquor by conventional methods such as by filtration, or by decantation of the mother liquor therefrom. Drying is accomplished by any suitable or conventional means, a preferred technique being to spray-dry the final slurry thereof at a temperature of from about 200° F. to about 500° F. The dried coprecipitate may be formed into particles of definite size and shape. For example, a suitable pelleting agent such as hydrogenated vegetable oils, graphite, etc., is commingled with the dried coprecipitate which is then compressed into pellets of uniform shape and size. Alternatively, the coprecipitate may be formed into the desired shape by extrusion methods, etc., or it may be utilized as a powder or as granules of different size and shape.

Regardless of the manner of shaping the coprecipitate and of the particular size and shape thereof, the coprecipitate is calcined at a temperature of at least 900° F. and generally within the range of from about 900° F. to about 1500° F. A preferred temperature range is from about 1100° F. to about 1300° F. The calcination may be effected in any suitable atmosphere. Usually the calcination is in the presence of air or other oxidizing media, although in some cases it may be preferred to calcine in a reducing atmosphere, as in the presence of hydrogen, or in an inert atmosphere, as in the presence of nitrogen. Although the coprecipitate thus calcined is utilized as a carrier material for catalytically active elements as hereinafter recited, it is understood that said calcined coprecipitate contributes to the over-all activity of the catalyst, either by exerting an independent effect or by a peculiar association with the other components of the catalysts to give a final catalyst of improved quality.

The calcined coprecipitate prepared in the described manner is impregnated with further amounts of molybdenum by conventional methods such as soaking, dipping, suspending, or otherwise immersing said calcined coprecipitate in an aqueous solution of ammonium molybdate, ammonium paramolybdate, molybdic acid, molybdenum trioxide, and the like, the molybdenum concentration of said solution being such as to insure a final calcined composite containing from about 15 wt. percent to about 50 wt. percent molybdenum as molybdenum oxide.

In a preferred embodiment of this invention the hydrorefining catalyst further comprises from about 1 wt. percent to about 20 wt. percent, and preferably from about 2 wt. percent to about 10 wt. percent, of a metal of Group VIII composited therewith. The Group VIII metal, e.g., iron, cobalt, rubidium, ruthenium, palladium, osmium, indium, platinum, and preferably nickel, can be impregnated on the final calcined composite described immediately above, or on the calcined coprecipitate previously described. In the latter case, the molybdenum impregnation may be subsequent to the Group VIII metal impregnation or, preferably, the molybdenum and the Group VIII metal can be impregnated simultaneously, as from a common solution thereof. The Group VIII metal impregnation may be accomplished as in the molybdenum impregnation described above utilizing nickel nitrate, nickel sulfate, cobaltous nitrate, cobaltous sulfate, ferric chloride, ferric sulfate, ferric nitrate, platinum chloride, chloroplatinic acid, chloropalladic acid, palladium chloride, etc., in aqueous solution.

After the calcined coprecipitate has been thus impregnated, the resulting composite is usually dried at a temperature of from about 200° F. to about 400° F. and further calcined in the manner above described.

The catalyst of this invention may be used in a sulfided form. After preparation in the manner hereinbefore set forth, the catalyst may be subjected to sulfidation by contacting the same with hydrogen sulfide or other suitable sulfurous materials, preferably at an elevated temperature which may range from about 500° F. to about 1000° F. or more. When the catalyst is utilized in the treatment of petroleum fractions containing sulfurous materials, sulfidation may be effected in situ during use of the catalyst in the hydrorefining process.

While the catalyst of the present invention will have a relatively long life, it may be desirable to regenerate the same after long periods of service. Regeneration may be effected in any suitable manner, including, for example, passing air, oxygen, etc., either as such or diluted with inert gas, in contact with the catalyst at a temperature sufficient to effect combustion of carbonaceous deposits on the catalyst and to oxidize the same.

Usually it is preferred to control the regeneration temperature not to exceed about 1200° F. In some cases it may be of advantage to precede or follow the oxidation with a reducing treatment by passing hydrogen or other reducing gas over the catalyst, preferably at an elevated temperature.

The hydrorefining process may be effected in any suitable manner including a fixed bed type of operation in which the petroleum fraction to be treated is admixed with hydrogen and passed, in either an upward or downward flow, through a reaction zone containing therein a fixed bed of catalyst and maintained at a predetermined temperature and pressure. Another type of operation is the fluidized system in which the catalyst is maintained in a state of turbulence under hindered settling conditions in the reaction zone.

Still in another type of operation is the moving catalyst operation in which the charge is passed either concurrently or countercurrently to a moving bed of catalyst. Still another type of operation is the slurry or suspensoid type in which the catalyst is carried as a slurry or suspension into a reaction zone. Regardless of the particular manner of effecting the hydrorefining process, the reaction mixture is fractionated or otherwise separated into the treated or converted product and excess hydrogen which may be vented or recycled within the process. The hydrogen fraction may be treated to remove sulfur, ammonia, etc., prior to recycling. When cracking is effected, the lower boiling converted products may be separated from the higher boiling unconverted products and the latter may be recycled within the process for further conversion therein.

The specific catalyst preparations hereinafter described were evaluated in relation to a standard catalyst by the method hereinafter referred to as the "standard relative activity" test. The relative activity of a particular catalyst is defined as the ratio of the space velocity required to result in a given product improvement, while employing the test catalyst, to the space velocity required to yield the same degree of product improvement while employing a standard catalyst, which relative activity is expressed as a percentage. The catalyst employed as the standard catalyst was an alumina-cobalt-molybdenum composite consisting of about 2.2 wt. percent cobalt, and about 6.0 wt. percent molybdenum. The product quality improvement was measured in terms of the residual total nitrogen content of the liquid product since the removal of the nitrogenous materials is the most difficult function required of catalysts of the type herein contemplated.

The relative activity test method consists essentially of processing a 50/50 blend of a Farmer's Union light and heavy vacuum gas oil through a fixed catalyst bed. This charge stock is characterized by an API gravity of 21.5° at 60° F., and initial boiling point of 535° F., a 50% distillation point of 776° F., and an end boiling point of 940° F., with 97.5% over and 2.5 percent bottoms. The light and heavy gas oil blend contains 2.52 wt. percent sulfur and 1180 p.p.m. total nitrogen. The charge stock is passed into a 1 inch I.D. stainless steel reactor. The reactor contains a single catalyst bed of 50 cubic centimeters capacity, and is maintained under an imposed hydrogen pressure of 1500 p.s.i., the hydrogen being recycled at a rate of 6000 s.c.f./bbl. of liquid charged. The standard catalyst, and each test catalyst, are subjected to three distinct test periods of from 4 to 7 hours duration, each test period being at a different liquid hourly space velocity in the range of from about 2 to about 10. The liquid product collected throughout each test period is analyzed to determine the total nitrogen concentration therein which is thereafter plotted on a logarithmic scale against the reciprocals of the three space velocities employed. From the resulting curve, drawn through the three points, a determination is made of the reciprocal of the space velocity required to yield a liquid product having a residual total nitrogen content of 100 p.p.m. The relative activity of the test catalyst is the ratio of the reciprocal space velocity, required to yield 100 p.p.m., of the standard catalyst to that of the catalyst being tested. The ratio is multiplied by the factor of 100, and a relative activity factor greater than 100 percent indicates a test catalyst having greater activity than the standard catalyst.

The following examples are introduced to illustrate further the novelty and utility of the present invention but not with the intention of unduly limiting the generally broad scope of the same as set out in the appended claims.

*Example I*

A catalyst comprising molybdenum and alumina was prepared according to the method of this invention by preparing a solution of 173.5 grams of ammonium molybdate (83% $MoO_3$) [$(NH_4)_6 \cdot Mo_7O_{24} \cdot H_2O$] in 1 liter of water and adjusting the pH thereof to about 11 by the addition of ammonium hydroxide. A solution of about 750.3 grams of aluminum nitrate $$[Al(NO_3)_3 \cdot 9H_2O]$$

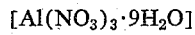

in 1.2 liters of water was rapidly added to the ammonium molybdate solution. The desired coprecipitate formed from the reaction mixture at a pH of about 6. After about a one hour interval the supernatant liquid was filtered from the coprecipitate. The coprecipitate was slurried with water and spray-dried at about 200–500° F., and then calcined at 1200° F. for about five hours. The resulting calcined coprecipitate contained about 40 wt. percent alumina and about 40 wt. percent molybdenum as molybdenum oxide. This calcined coprecipitate was separated into three portions.

*Example II*

The first portion of the calcined molybdenum-alumina coprecipitate of Example I is impregnated with about 10 wt. percent molybdenum as molybdenum oxide by immersing 80 grams of said coprecipitate in an aqueous solution of 16 grams ammonium molybdate in a rotary steam dryer at about 212° F. The calcined coprecipitate is thereby impregnated and dried in one operation. The impregnation composite is thereafter calcined at 1200° F. to produce a calcined composite comprising 10 wt. percent molybdenum, as molybdenum oxide, on a carrier material comprising about 40 wt. percent alumina and 40 wt. percent molybdenum as molybdenum oxide. The relative activity of this catalyst is from about 120 to about 130 when tested by the prescribed method.

*Example III*

A second portion of the calcined molybdenum-alumina coprecipitate of Example I was impregnated with about 2.5 wt. percent nickel and about 10 wt. percent molybdenum by immersing 80 grams of said calcined coprecipitate in a solution of 16 grams of ammonium molybdate and 10.6 grams of nickel nitrate in 150 mls. water, utilizing a rotary steam dryer at a temperature of about 212° F. The resulting composite was thereafter calcined at a temperature of about 1200° F. The final catalyst composite consisted of about 2.5 wt. percent nickel and about 10 wt. percent molybdenum as molybdenum oxide, on a carrier material comprising about 40 wt. percent alumina and about 40 wt. percent molybdenum as molybdenum oxide. This catalyst, when tested by the prescribed method, had a relative activity of 150.

Comparison of the catalysts prepared according to the method of this invention with the "standard catalyst" prepared by conventional methods illustrates the superiority of catalysts of high molybdenum content prepared by the method herein disclosed. Impregnation of the alumina-molybdenum coprecipitate of Example I with additional quantities of molybdenum, as in Example II, or with molybdenum and nickel, as in Example III, will result in a catalyst capable of separating nitrogenous materials from comparatively high boiling petroleum fractions. This is advantageous not only with respect to the separation of undesirable nitrogenous materials, but also in that the catalytic activity of the Group VIII metals such as nickel is more fully realized.

I claim as my invention:

1. A method of hydrorefining a nitrogenous petroleum fraction boiling in the range of from about 400° F. to about 1200° F. and containing in excess of about 1 p.p.m. nitrogen, which method comprises treating said petroleum fraction in admixture with hydrogen at hydrorefining conditions in contact with a hydrorefining catalyst comprising a composite prepared by commingling a solution of a compound of molybdenum and a solution of a compound of at least one metal from Groups IIIA and IVB of the Periodic Table at a pH of from about 3.8 to about 7 and forming a coprecipitate, calcining the coprecipitate, the amount of said molybdenum compound being sufficient to form a calcined coprecipitate containing about 40 wt. percent molybdenum as molybdenum oxide, and impregnating said calcined coprecipitate with further amounts of molybdenum by contacting the same with a solution of a compound of molybdenum, the concentration of said solution being such as to insure a final calcined composite containing about 50 wt. percent molybdenum as molybdenum oxide.

2. The method of claim 1 further characterized in that said final calcined composite contains from about 1 wt. percent to about 20 wt. percent of a metal of Group VIII composited therewith.

3. The method of claim 2 further characterized in that said metal of Group VIII is nickel.

4. A method of hydrorefining a nitrogenous petroleum fraction boiling in the range of from about 400° F. to about 1200° F. and containing in excess of about 1 p.p.m. nitrogen, which method comprises treating said petroleum fraction in admixture with hydrogen at hydrorefining conditions in contact with a hydrorefining catalyst comprising a composite prepared by commingling a solution of a compound of molybdenum and a solution of a compound of aluminum at a pH of from about 3.8 to about 7 and forming a coprecipitate, calcining the coprecipitate, the amount of said molybdenum compound being sufficient to form a calcined coprecipitate containing about 40 wt. percent molybdenum as molybdenum oxide, and impregnating said calcined coprecipitate with further amounts of molybdenum by contacting the same with a solution of a compound of molybdenum, the concentration of said solution being such as to insure a final calcined composite containing about 50 wt. percent molybdenum as molybdenum oxide.

5. The method of claim 4 further characterized in that said final calcined composite contains from about 1 wt. percent to about 20 wt. percent of a metal of Group VIII composited therewith.

6. The method of claim 5 further characterized in that said metal of Group VIII is nickel.

7. A method of hydrorefining a nitrogenous petroleum fraction boiling in the range of from 400° F. to about 1200° F. and containing in excess of about 1 p.p.m. nitrogen, which method comprises treating said petroleum fraction in admixture with hydrogen at hydrorefining conditions in contact with a hydrorefining catalyst comprising a composite prepared by commingling an aqueous ammoniacal solution of a compound of molybdenum and an aqueous solution of an inorganic aluminum salt at a pH of from about 3.8 to about 7 and forming a coprecipitate, the amount of said molybdenum compound being sufficient to form a calcined coprecipitate containing about 40 wt. percent molybdenum as molybdenum oxide, calcining said coprecipitate at a temperature of from about 900° F. to about 1500° F., impregnating said calcined coprecipitate with further amounts of molybdenum by contacting the same with an aqueous solution of a compound of molybdenum, the concentration of said solution being such as to insure a final calcined composite containing about 50 wt. percent molybdenum as molybdenum oxide.

8. The method of claim 7 further characterized in that said final composite contains from about 1 wt. percent to about 20 wt. percent of a metal of Group VIII composited therewith.

9. The method of claim 8 further characterized in that said metal of Group VIII is nickel.

10. A method of hydrorefining a nitrogenous petroleum fraction boiling in the range of about 400° F. to about 1200° F. and containing an excess of about 1 p.p.m. nitrogen, which method comprises treating said petroleum fraction in admixture with hydrogen at hydrorefining conditions in contact with a hydrorefining catalyst comprising a composite prepared by commingling an aqueous ammoniacal solution of ammonium molybdate and an aqueous solution of aluminum nitrate at a pH of from about 3.8 to about 7 and forming a coprecipitate, calcining said coprecipitate at a temperature of from about 900° F. to about 1500° F., the amount of said ammonium molybdate being sufficient to form a calcined coprecipitate containing about 40 wt. percent molybdenum as molybdenum oxide, impregnating said calcined coprecipitate with further amounts of molybdenum by contacting the same with an aqueous solution of ammonium molybdate the concentration of said solution being such as to insure a final calcined composite containing about 50 wt. percent molybdenum as molybdenum oxide.

11. The method of claim 10 further characterized in that said final composite contains from about 1 wt. percent to about 20 wt. percent of a metal of Group VIII composited therewith.

12. The method of claim 11 further characterized in that said metal of Group VIII is nickel.

References Cited by the Examiner

UNITED STATES PATENTS

| | | | |
|---|---|---|---|
| 2,481,824 | 9/49 | Claussen et al. | 252—465 |
| 2,536,085 | 1/51 | Pitzer | 252—465 |
| 2,943,067 | 6/60 | Sieg | 252—465 |
| 2,968,634 | 1/61 | Nahin | 252—465 |
| 3,031,420 | 4/62 | Schindler et al. | 252—465 |
| 3,094,480 | 6/63 | Richardson | 208—254 |
| 3,114,701 | 12/63 | Jacobson et al. | 208—254 |

ALPHONSO D. SULLIVAN, *Primary Examiner.*